United States Patent Office 3,242,128
Patented Mar. 22, 1966

3,242,128
COATING COMPOSITIONS COMPRISING AROMATIC POLYAMIC ACID AND SOLVENT THEREFOR WITH VISCOSITY STABILIZING AGENT THEREFOR
John R. Chalmers, Wallingford, Pa., assignor to E. I. du Pont de Nemours and Company, Wilmington, Del., a corporation of Delaware
No Drawing. Filed July 30, 1962, Ser. No. 213,152
12 Claims. (Cl. 260—32.6)

This invention relates to stabilized organic solvent solutions of polyamic acids, and more particularly, to a method of retarding the rate of viscosity increase or delaying ultimate gelation which organic solvent solutions of polyamic acids normally exhibit during storage.

Certain classes of polyamic acids have outstanding physical and chemical properties which make them extremely useful for shaping into useful structures by coating on various substrates, casting as films, extruding through dies, or by similar processing. Such polyamic acid structures can be converted by heating or by chemical means to polyimide structures, polyamide acid salt structures, and polyamide acid ester structures which are characterized by properties even more desirable than those of the polyamic acids.

By the term "polyamic acid" as used throughout the specification is meant polymer compositions having a plurality of recurring units having the following general formula:

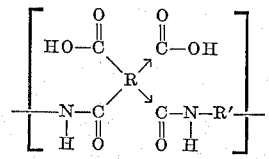

wherein

is an organic tetravalent radical containing at least two carbon atoms, no more than two carbonyl groups of each polyamide acid unit being joined to any one carbon atom of the tetravalent radical

—R'— is a divalent radical originating from at least one organic diamine having the structural formula:

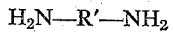

$H_2N$—R'—$NH_2$ wherein —R'— is a divalent organic radical containing at least two carbon atoms, the two amino groups thereof each being attached to separate carbon atoms of the indicated divalent radical. The tetravalent radical

originates from at least one tetracarboxylic acid dianhydride having the structural formula:

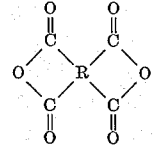

wherein

is an organic tetravalent radical as hereinbefore defined. The arrow → denotes isomerism. The number of recurring polyamic acid units in the polymer structure is sufficient to provide an inherent viscosity of at least 0.1, preferably 0.3 to 5, as measured as a 0.5% solution in N,N-dimethylacetamide usually at 30° C., sometimes at 25° C.

The process for preparing the polyamic acid compositions comprises reacting by mixing at least one of the organic diamines having the structure $H_2N$—R'—$NH_2$ with at least one tetracarboxylic acid dianhydride of the identified structure in an organic solvent for at least one of the reactants, the solvent being inert to the reactants and preferably anhydrous. The reaction is carried out by heating the reactants at a temperature below 175° C. The reaction temperature and reaction period will vary with the particular combinations of reactants used and the particular solvent used. The reaction is exothermic and consequently the reaction temperature is so selected as to be adequately controllable to result in a polymer composition whereof at least 50% by weight of the structural units have the indicated polyamic acid structure, i.e., less than 50% of the units have been converted to polyimide structure. Although the reaction period may be as short as one minute, the reaction conditions are generally so selected as to provide a polymer composition of the desired characteristics which requires a reaction period usually in the range from about 30 to about 500 minutes. For the development of maximum inherent viscosity and optimum properties, it is usually necessary to operate at a reaction temperature below 60° C., preferably no greater than about 50° C.

The reactants usually are in equimolar proportions but can range up to 5% excess of either reactants. More than this excess of either reactant results in undersirably low molecular weight polyamic acid or other disadvantages. It is usually desirable for the excess of either reactant not to exceed about 3%. Besides use of such an excess of either reactant to control the molecular weight of the polymer, a chain-terminating agent may be used to "cap" the ends of the polymer chains, e.g., phthalic anhydride can be used for this purpose.

The proportion of organic solvent need only be sufficient to dissolve enough of one reactant, preferably to dissolve the diamine, to initiate the reaction of the diamine and the dianhydride. For forming the polyamic acid compositions into shaped articles, most successful results are obtained when the solvent component constitutes at least 60% of the final polymer solution, i.e., the solution may contain from 0.05 to 40% of the polymer component. For coating purposes, the content of polyamic acid usually is in the range of 3% to 30%. If desired, the polyamic acid can be isolated in a stable form by precipitation from the polymer solution with a non-solvent for the polyamic acids, e.g., cyclohexanone, dioxane, benzene, etc.

Solutions of the polyamic acids in organic solvents are particularly useful as coating compositions. Polyimides resulting from conversion of the applied polyamic acid coating exhibit advantageous electrical properties which makes these polymers particularly interesting as high temperature electrical insulation. Solutions of these convertible polyamic acids are found to be not particularly stable in viscosity. Lack of adequate viscosity stability in the package presents a problem pertinent to commercial use of the polyamic acid solutions. These polymer solutions are observed to increase in viscosity at a relatively rapid rate and even gel during a short period of storage. Thus, the user of the polymer solution finds it necessary to apply the solution as a coating or convert it to shaped articles promptly after preparation of the solution or compensate for the increase in solution viscosity prior to gelation by use of additional solvent. Such compensating reduction in the polyamic acid content of the solution reflects a lower build of the coating per coat and thus requires an increased number of coats to achieve the desired coating thickness. This need for additional solvent and for additional applied coats adds to the cost of applying a unit amount of the polyamic acid. In commercial practice, a typical solution of polyamic acid at approximately 16.5% concentration which is particularly useful as a wire enamel coating exhibits an initial viscosity of 40 to 80 poises, exhibits about 100% increase in viscosity in 4 to 5 weeks, and gels in about 11 weeks at 38° C. with a viscosity of about 1300 poises. The solution is impractical to use after about six weeks when the viscosity has significantly exceeded 150 poises. Application viscosity for wire coating with these solutions of polyamic acid usually is in the range of 40 to 80 poises, preferably 50 to 70 poises. These solutions in which the viscosity at 38° C. registers more than 100% increase are usually recognized as unusable for the coating operation.

The primary objective of this invention is to provide solutions of polyamic acid which are characterized by improved viscosity stability characteristics. More specifically, the objective is to provide solutions of polyamic acid which are characterized by a retarded rate of viscosity increase during storage under ordinary storage conditions, i.e., the respective periods of time for the solution of the polyamic acid to reach the gel state and to register a viscosity increase in excess of 100% of the initial viscosity are significantly extended.

These objectives and other objectives hereinafter disclosed are accomplished by blending into the solution of the polyamic acid an effective small proportion, sufficient to adequately retard the rate of viscosity increase of the solution during storage, of a chemical compound selected from the group consisting of formic acid, monochloroacetic acid, benzaldehyde, p-nitrobenzaldehyde, and p-aminophenol. Effective proportions of these stabilizing compounds are in the over-all range of from about 0.0003 gram mole to about 0.025 gram mole per 100 grams of the polyamic acid in the solution. The particularly useful range for formic acid and monochloroacetic acid is about 0.004 to 0.025 gram mole per 100 grams of the polymer and the particularly useful range of the indicated substituted aromatic compounds, benzaldehyde and p-aminophenol is from 0.001 to 0.007 gram mole per 100 grams of the polymer. The para-nitrobenzaldehyde is still more effective and useful in the range of 0.0003 to 0.003 gram mole. Use of proportions of these aromatic compounds in excess of the indicated respective maximum proportions of 0.007 and 0.003 gram mole and proportions of formic acid or monochloroacetic acid in excess of about 0.025 gram mole on the indicated basis is usually avoided because presence of such excessive proportions leads to significant degradation of the viscosity of the solution of the polyamic acid in comparison with the initial solution viscosity. A proportion of at least 0.004 gram mole of formic acid, monochloroacetic acid or mixtures thereof, per 100 grams of the polymer in solution is necessary to provide a significant contribution toward stabilization of the solution viscosity. This minimum molar proportion of these effective acids is greater than the minimum effective proportions of the indicated aromatic compounds, but on a weight basis these minimum proportions are approximately of the same order of magnitude. These effective solution viscosity stabilizers are simply blended into the preformed solution of the polyamic acid. If desired, they can be introduced as a solution of the stabilizing compound in a non-reactive organic solvent compatible with the solution of the polyamic acid.

None of these stabilizing compounds used in the indicated stabilizing proportions have an adverse effect on the solutions of the polyamic acids or on the properties of coatings and other shaped articles resulting from conversion of the polyamic acids to polyimides.

Useful organic diamine reactants for preparing the polyamic acids are characterized by the general formula $H_2-N-R'-NH_2$ wherein $-R'-$ is as heretofore defined and may be selected from the following general groups: aromatic, aliphatic, heterocyclic, bridged organic radicals wherein the bridging moiety is oxygen, nitrogen, sulfur, silicon, or phosphorus, and substituted groups thereof. Preferred diamines contain at least six carbon atoms preferably including a structure characterized by benzenoid unsaturation. These preferred diamines having benzenoid unsaturation may be further characterized by $-R'-$ being identified by one of the following structures:

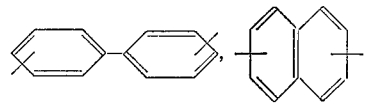

and

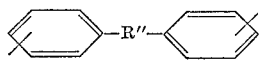

wherein the moiety $-R''-$ can be an alkylene chain of 1 to 3 carbon atoms, $-O-$, $-S-$, $-SO_2-$

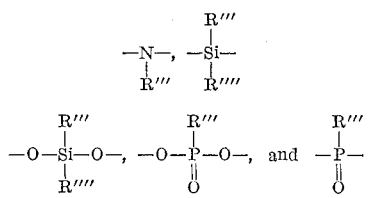

wherein $-R'''-$ and $-R''''-$ are selected from the group consisting of alkyl and aryl. The following species of diamines are typical of suitable diamine reactants for practicing the invention:

4,4'-diamino-diphenyl ether
4,4'-diamino-diphenyl methane
4,4'-diamino-diphenyl propane
Meta-phenylene diamine
Para-phenylene diamine
4,4'-diamino-diphenyl sulfone Benzidine
4,4'-diamino-diphenyl sulfide
3,3'-diamino-diphenyl sulfone
Bis-(4-amino-phenyl)phosphine oxide
Bis-(4-amino-phenyl)diethyl silane
m-Xylylene diamine
p-Xylylene diamine
Hexamethylene diamine
Heptamethylene diamine
Octamethylene diamine
Nonamethylene diamine
Decamethylene diamine
Dodecamethylene diamine
2,11-diamino-dodecane
3-methylheptamethylene diamine
4,4-dimethylheptamethylene diamine
2,2-dimethyl propylene diamine
2,5-dimethylhexamethylene diamine
2,5-dimethylheptamethylene diamine
5-methylnonamethylene diamine
1,12-diamino-octadecane
1,4-diamino-cyclohexane 2,6-diaminopyridine
1,5-diaminonaphthalene
3,3'-dimethyl-4,4'-diamino-biphenyl
2,4-bis-(beta-amino-t-butyl)toluene
Bis-(para-beta-amino-t-butyl-phenyl)ether
Para-bis-(2-methyl-4-amino-penthyl)benzene
Para-bis-(1,1-dimethyl-5-amino-pentyl)benzene
Bis-(para-amino-cyclohexyl)methane
1,2-bis-(3-amino-propoxy)ethane
3-methoxy-hexamethylene diamine
Bis-(4-amino-phenyl)-N-methylamine
3,3'-dimethoxy benzidine
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$ Mixtures of these species of the diamines can be used to provide copolyamic acid compositions.

Useful tetracarboxylic acid dianhydride reactants are characterized by the general formula:

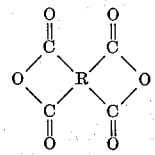

wherein the tetravalent radical

is as heretofore defined and may be selected from the following general groups: aromatic, aliphatic, cycloaliphatic, heterocyclic, combinations of aromatic and aliphatic, and substituted groups thereof. Preferred tetracarboxylic acid dianhydrides contain at least six carbon atoms in the

radical, preferably including a structure characterized by benzenoid unsaturation. The four carbonyl groups of the dianhydride are each joined to separate carbon atoms and each pair of carbonyl moieties of the anhydride is joined directly to adjacent carbon atoms in the

radical to provide a 5-member anhydride ring identified as follows:

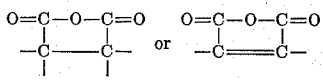

The following species are typical of tetracarboxylic acid dianhydrides suitable for practicing the invention:

Pyromellitic dianhydride
3,3',4,4', benzophenone tetracarboxylic dianhydride
2,2',3,3'-benzophenone tetracarboxylic dianhydride
3,3',4,4'-diphenyl tetracarboxylic dianhydride
2,2',3,3'-diphenyl tetracarboxylic dianhydride
2,2-bis-(3,4-dicarboxyphenyl)propane dianhydride
2,2-bis-(2,3-dicarboxyphenyl)propane dianhydride
Bis-(3,4-dicarboxyphenyl)ether dianhydride
Bis-(3,4-dicarboxyphenyl)sulfone dianhydride
1,1-bis(2,3-dicarboxyphenyl)ethane dianhydride
1,1-bis-(3,4-dicarboxyphenyl)ethane dianhydride
Bis-(2,3-dicarboxyphenyl)methane dianhydride
Bis-(3,4-dicarboxyphenyl)methane dianhydride
2,3,6,7-naphthalene tetracarboxylic dianhydride
1,2,4,5-naphthalene tetracarboxylic dianhydride
1,2,5,6-naphthalene tetracarboxylic dianhydride
Benzene-1,2,3,4-tetracarboxylic dianhydride
Perylene-3,4,9,10-tetracarboxylic dianhydride
Pyrazine-2,3,5,6-tetracarboxylic dianhydride
Thiophene-2,3,4,5-tetracarboxylic dianhydride Solvents which are useful in synthesizing the polyamic acid compositions by solution polymerization are substantially inert organic liquids, other than either of the polymer-forming reactants or homologs thereof, which constitute a solvent for at least one of the reactants, and contains functional groups, the functional groups being groups other than monofunctional primary and secondary amino groups and other than monofunctional dicarboxyanhydro groups. Preferably the solvent is characterized by solvency for both of the reactants and, preferably, also by solvency for the polyamic acid reaction product. A particularly useful class of solvents are the normally liquid N,N-dialkylcarboxylamides of which the lower molecular weight species are preferred, e.g., N,N-dimethylformamide and N,N-dimethylacetamide. These solvents can be easily removed from the polyamic acid composition, coatings thereof and shaped articles thereof by evaporation, displacement or diffusion. Other useful solvents of this class are: N,N-diethylformamide, N,N-diethylacetamide, and N,N-dimethoxyacetamide. Other typical useful solvents which may be used alone or in combination with these N,N-dialkylcarboxylamides include: N-methyl caprolactam, N-methyl-2-pyrrolidone, N-acetyl-2-pyrrolidone, dimethylsulfoxide, tetramethylene urea, pyridine, dimethylsulfone, tertamethylene sulfone, formamide, N-methyl formamide, and hexamethylphosphoramide. These more active solvents can be used in combination with poor solvents such as dioxane, butyrolactone, benzonitrile, benzene, toluene, xylene, and cyclohexane.

The procedure for reacting the diamine and tetracarboxylic acid dianhydride to produce the polyamic acid composition can be carried out by any of several methods. One technique is to premix equimolar proportions of the two reactants as dry solids and then add the uniform dry mixture, in small proportions and with agitation, to the organic solvent, controlling the temperature and rate of the process to a reaction temperature below a predetermined value which minimizes conversion of the polyamic acid to polyimide, preferably below 50° C. Alternatively, the solvent can be added to the mixture of the reactants. Another method is to dissolve the diamine in the solvent, while agitating and preheating the solution to an elevated temperature, and then to add the dianhydride at a rate adequate to control the ultimate maximum reaction temperature. Still another method is to add the respective reactants in small portions to the solvent individually and alternately, i.e., first diamine, then dianhydride, then diamine, etc. A further process comprises dissolving the diamine in a portion of the solvent and the dianhydride in a second portion of the same or another solvent and then mixing the respective solution of reactants. Combinations of these methods can also be used to advantage. For example, the polyamic acid composition can be prepared by a first stage solution polymerization in which the dianhydride either in dry solid form or in solution is added incrementally to a solution of the diamine followed by a second stage in which a mixture of the dry solid reactants are slowly added to the solution of the polyamic acid resulting from the first stage reaction.

The reaction is controlled to provide a polyamic acid having an inherent viscosity of at least 0.1, preferably in the range of 0.3 to 5, based on a solution of 0.5% by weight of the polyamic acid in N,N-dimethylacetamide usually at 30° C. Other active solvents can be used in lieu of the N,N-dimethylacetamide. The viscosity of the dilute solution of the polyamic acid is measured relative to viscosity of the solvent alone and the inherent viscosity is calculated on the basis of:

$$\text{Inherent viscosity} = \frac{\text{natural logarithm} \frac{\text{Viscosity of solution}}{\text{Viscosity of solvent}}}{C}$$

where C is the concentration of the polyamic acid in solution expressed as grams of polymer per 100 milliliters of solution.

For coating and impregnating purposes, the solution of polyamic acid is adjusted in the proportion of volatile solvent and polyamic acid content to provide the solution with application properties conforming with the particular technique of application. The polymer solution may be pigmented with inert pigments, e.g., titanium dioxide, in usual proportions ordinarily ranging from 5 to 200 parts per 100 parts of the polymer. It is necessary that the pigment be substantially inert so that it does not react with the stabilized polyamic acid composition.

The invention compositions can be applied to a variety of substrates, for example, to metals, e.g., copper, brass, aluminum, steel, etc., in the form of sheet metal, fibers, wires, screening; glass in the form of sheets, fibers, foams, fabrics, etc.; polymeric materials, e.g., cellulosic materials, such as cellophane, paper, wood; polyolefins, e.g. polyethylene, polypropylene, polystyrene; polyamides, polyvinylacetals, polyesters, e.g., polyethylene terephthalate; polyurethanes; perfluorocarbon polymers, e.g., polytetrafluoroethylene, tetrafluoroethylene/hexafluoropropylene copolymers, such as polymeric materials being in the form of sheets, fibers, foams, woven and non-woven fabrics, screening, coatings, leather sheets, etc. The invention solutions are particularly useful for depositing a coating of polyamic acid on wire and converting the deposited coating to polyimide having advantageous electrical insulating properties. Combination coatings may have either a primer, intermediate or topcoat layer provided by the invention composition, the remaining layers being provided by one or more of the aforementioned film-forming materials.

Preparation of polyamic acid compositions are more fully described and claimed in copending applications Edwards, Serial No. 761,968, filed September 19, 1958, now abandoned, and a continuation-in-part thereof, Serial No. 95,014, filed March 13, 1961, now U.S. Patent No. 3,179,614. Polyimide compositions resulting from conversion of polyamic acid are described and claimed in copending application Edwards, Serial No. 803,347, filed April 1, 1959, now abandoned, and a continuation-in-part thereof, Serial No. 169,120, filed January 26, 1962, now U.S. Patent No. 3,179,634. Methods for converting polyamic acids to polyimides are described and claimed in copending applications Endrey, Serial No. 803,349, filed April 1, 1959, now abandoned, and in a continuation-in-part thereof, Serial No. 169,119, filed January 26, 1962, now U.S. Patent No. 3,179,633, and copending Endrey, Serial No. 169,106, filed January 26, 1962, now U.S. Patent No. 3,179,630.

Presence of the polymer, i.e., the polyamic acid, in the final composition is determined by infrared adsorption spectra. The spectra therefore are characterized by an adsorption band at about 3.1 microns due to the N—H bond of the amide groups, at about 5.8 microns due to the C=O bond of the carboxyl groups, and at about 6.0 microns due to the C=O bond of the amide groups. The spectra is lacking in bands representing anhydride and free amino groups, indicating full conversion of the reactants to polyamic acids.

The invention will be more clearly understood by reference to the examples and experiments which follow. These examples, which illustrate specific embodiments of the invention, should not be construed to limit the invention in any way. The proportions and percentages are expressed on a weight basis unless otherwise indicated. The weight percentage of modifying compound in Experiments D, E, F and G is expressed molecularly equivalent to formic acid, i.e., actual weight percent of compound =

$$\frac{\text{designated weight} \times \text{mol. wt.}}{\text{mol. wt. of formic acid}}$$

PREPARATION OF POLYAMIC ACID
COMPOSITION I

| | Pounds |
|---|---|
| First portion: | |
| N,N-dimethylacetamide | 739.5 |
| N-methyl-2-pyrrolidone | 1479.0 |
| 4,4'-diaminodiphenyl ether | 209.7 |
| Second portion: | |
| Pyromellitic dianhydride | 221.7 |
| Third portion: | |
| Pyromellitic dianhydride | 2.1 |
| | 2652.0 |

Pyromellitic dianhydride is the dianhydride of 1,2,4,5-benzenetetracarboxylic acid.

The ingredients of the first portion are charged into a 300-gallon stainless steel reaction vessel equipped with means for temperature control, and controllable agitation means for rapidly and thoroughly mixing the composition. The first portion charge is mixed with moderate agitation, about 75 r.p.m., with the temperature of the charge being adjusted to the 20° to 25° C. range. Mixing is continued until the diamine reactant is completely in solution. The second portion, i.e., the pyromellitic dianhydride, is added to the preformed solution at a rate of about 2.5 pounds per minute with rapid agitation of about 150 r.p.m. Charging of the second portion is complete in about 90 minutes. The reaction mixture is thoroughly mixed during the charging of the pyromellitic dianhydride and thereafter until the power input to the mixing means becomes constant. Heat is extracted from the exothermic reaction mixture to maintain the temperature below 40° C., usually in the 20° C. to 35° C. range. A preliminary viscosity determination is made of the composition and the pyromellitic dianhydride of the third portion is added with rapid agitation to the reaction mixture if the preliminary viscosity is Z–1 or less on the Gardner-Holdt scale at 25° C. This third portion is omitted if the preliminary viscosity is within the contemplated viscosity range for the composition. About one-half of the pyromellitic dianhydride of the third portion is added if the viscosity is about Z–2. The resulting polyamic acid solution is usually characterized by a viscosity of 40 to 80 poises at 25° C. as measured with a Brookfield viscosimeter using a #3 spindle at 12 r.p.m. The polymer content of the resulting polyamic acid composition is about 16.5% by weight.

Based on the total recipe charge of pyromellitic dianhydride, the two reactants are in approximately equal molar proportions. In the absence of the third portion charge of the pyromellitic dianhydride, the molar proportion of the diamine is in slight excess, i.e., less than 3%. Typical lots of polyamic acid composition prepared according to this recipe result in polyamic acid characterized by an inherent viscosity usually in the range of 0.8 to 1.2 at 25° C.

*Experiment A*

The above-identified Composition I is weighed out into 200-gram portions. One portion is reserved as the comparative composition. To four other portions formic acid is respectively added and uniformly blended therewith in proportions corresponding to 0.5%, 1%, 2% and 5% based on the content of the polyamic acid. The viscosities are determined initially and at about weekly intervals after storage in an oven at about 38° C. The unmodified comparative polyamic acid Composition I exhibits an initial viscosity of 49 poises and, after a slight dip in viscosity the first week, exhibits an ascending rate of viscosity increase to about 100 poises in five weeks, 420 poises in nine weeks, and gelation in eleven weeks. The composition modified with 0.5% of formic acid, designated A–0.5, retains its initial viscosity for about four weeks, then exhibits a slight decline in viscosity during the next four weeks, regains its original viscosity by the ninth week, increases to 80 poises by the eleventh week, and gels by the thirteenth week. The composition modified with 1% of formic acid, designated A–1, exhibits a viscosity pattern during storage similar to that of the composition modified with 0.5% formic acid, except that the viscosity dip is slightly greater. This solution regains its original viscosity in about twelve weeks and is in a gel state at the thirteenth week, the viscosity in the gel state being 516 poises. The compositions modified with 2% and 5% of formic acid, respectively designated A–2 and A–5, each exhibit a rapid and significant decline in viscosity from the initial viscosity. For example, the viscosity at the end of six weeks is only about 10% of the original viscosity. After reaching a minimum viscosity of about 3 poises, approximately 7.5% of the original viscosity, both A–2 and A–5 register a regain in viscosity and by the twelfth week A–2 is restored to a viscosity only about 47% of the original viscosity and A–5 is restored to a viscosity only about 23% of the original viscosity. Both compositions gel in the thirteenth week. Compositions A–0.5 and A–1 constitute a useful improvement over the comparative Composition I. While Compositions A–2 and A–5 retard the viscosity increase and delay gelation, the reverse effect of significant viscosity decrease during storage likewise is disadvantageous.

*Experiment B*

In another series of modified compositions, portions of the polyamic acid Composition I are blended respectively with 0.5%, 1%, 2% and 5% of acetic acid. The viscosity performance of this B series during storage is comparable with that of the unmodified polyamic acid Composition I, i.e., acetic acid provides no significant retarding effect on the normal viscosity increase of the polyamic acid solution or on gelation characteristics. Sodium acetate and sodium formate substituted for acetic acid and formic acid are likewise ineffective. These salts are incompatible with the polyamic acid solution.

*Experiment C*

The Experiment A is partially repeated using a second prepared lot of polyamic acid Composition I and blending formic acid with portions thereof in the respective proportions of: 0.1%, 0.5% and 1%. These samples are designated C–0.1, C–0.5 and C–1 respectively. The unmodified comparative polyamic acid Composition I exhibits its normal viscosity pattern of registering a slight viscosity dip during the first two weeks and then exhibits a rapid viscosity increase to about 500 poises and gel structure in ten weeks. 100% increase over the original viscosity is reached in between five and six weeks. Compositions C–0.5 and C–1 exhibit viscosity stability during storage comparable to Compositions A–0.5 and A–1. In thirteen weeks of storage, after a slight-to-moderate decrease in viscosity which is at acceptable level, C–0.5 registers an 8% increase in viscosity over the original value. C–1 registers a 34% increase over the original. Composition C–0.1 registers only an insignificant improvement over the unmodified Composition C. For example, the period for 100% increase in viscosity is between six and seven weeks in contrast with the five to six weeks for the comparative composition. Further exploration of the concentration areas between 0.1% to 0.5% of formic acid based on the polyamic acid content reveals that the minimum effective concentration is about 0.18% or about 0.004 gram mole of formic acid per 100 grams of the polyamic acid in solution. The maximum practical concentration which is effective without a significant adverse decrease in viscosity of the solution is about 1.15% or approximately 0.025 gram mole of formic acid per 100 grams of the polyamic acid.

*Experiment D*

Portions of polyamic acid Composition I are blended respectively with 0.25%, 0.5%, 1% and 2% of monochloroacetic acid, dichloroacetic acid, trichloroacetic acid, hydroxyacetic acid, and lactic acid based on the content of polyamic acid. Viscosity surveillance of these solutions during storage reveals that only monochloroacetic acid at 0.5%, 1% and 2% levels exhibits effectiveness comparable with that of formic acid. At the 0.25% level monochloroacetic acid is not adequately effective. Modification with dichloroacetic acid, trichloroacetic acid, hydroxyacetic acid and lactic acid offers no advantage over the unmodified polyamic acid solution, i.e., these substituted acetic acids, except monochloroacetic acid, like acetic acid itself are practically ineffective for controlling the solution viscosity characteristics. Re-evaluation of monochloroacetic acid reveals that effective proportions thereof are approximately the same as for formic acid when calculated on a molar equivalent basis, i.e., the useful effective proportion is from about 0.004 to 0.025 gram mole per 100 grams of the polyamic acid.

Orthophosphoric acid also is an ineffective compound. For example, at the 1% level, this modified solution of polyamic acid gelled in two weeks. Still other acids which are ineffective are: orthotoluic having a pKa value of 3.89 comparable with that of formic acid, and cyanoacetic acid having a pKa value of 2.44 comparable with that of monochloroacetic acid, and para-toluenesulfonic acid.

*Experiment E*

Polyamic acid Composition I is modified with benzaldehyde in the respective proportions of 0.05%, 0.1%, 0.2% 0.25%, 0.5% and 1% based on the polymer content of the solution. Surveillance of the viscosity during storage at 38° C. reveals that benzaldehyde is adequately effective at the indicated proportions, except at the 0.05% level. At the 1% concentration, however, the viscosity decrease is beyond the desirable level. Further examination of proportions at the low end and high end of the range of effective proportions reveals that the useful effective minimum is approximately 0.001 gram mole and the practical effective maximum is about 0.007 gram mole per 100 grams of the polymer in solution.

*Experiment F*

This experiment is the same as Experiment E except that para-aminophenol is used in place of the benzaldehyde in the indicated proportions. The effectiveness of the para-aminophenol for controlling the viscosity of the polymer solution during storage and for delaying gelation is comparable with that of benzaldehyde, except that the aminophenol exhibits a detectable effect at as low as 0.05% concentration. At the 1% concentration, the viscosity decrease is excessive. The useful range is likewise approximately 0.001 to 0.007 gram mole per 100 grams of the polyamic acid content of the solution.

*Experiment G*

Portions of polyamic acid Composition I are blended with para-nitrobenzaldehyde in the proportions of 0.01%, 0.05%, 0.1%, 0.2%, 0.5% and 1% based on the weight of the polymer. Viscosity surveillance of these modified compositions during storage reveals that para-nitrobenzaldehyde is especially effective over the range of 0.05% to 0.2% for controlling the viscosity characteristics and for retarding gelation. Above the 0.2% concentration, the respective solutions exhibit a significant viscosity decline during storage, although the decrease at 0.5% concentration can be tolerated for some uses. The useful effective proportions of para-nitrobenzaldehyde are approximately 0.0003 to 0.003 gram mole per 100 grams of the polyamic acid. Hence, the para-nitrobenzaldehyde is more effective than the modifying aromatic compounds of Experiments E and F at equal concentrations.

*Experiment H*

Preparation of the polyamic acid Composition I is repeated except using N,N-dimethylacetamide as a single solvent medium for the solution polymerization. Portions of this solvent modification of the Composition I are respectively blended with 0.15%, 0.25%, 0.5% and 1% of formic acid. Viscosity surveillance of these formic acid modified compositions during storage at about 38° C. reveals the same pattern of viscosity characteristics as are observed in Experiment C. The stabilized compositions remain at a useful coating viscosity for a period of at least 12 weeks in contrast with 5 to 6 weeks for the comparative unmodified polyamic acid composition, i.e., the storage period during which the composition remains at useful coating viscosity is at least doubled.

PREPARATION OF POLYAMIC ACID
COMPOSITION II

| First portion: | Grams |
|---|---|
| 4,4'-oxydianiline | 32.0 |
| N,N-dimethylacetamide | 143.0 |
| N-methyl-2-pyrrolidone | 286.0 |
| Second portion: | |
| Benzophenonetetracarboxylic acid dianhydride | 52.1 |
| Third portion: | |
| Benzophenonetetracarboxylic acid dianhydride | 0.5 |
| Fourth portion: | |
| Benzophenonetetracarboxylic acid dianhydride | 0.45 |
| | 514.05 |

The first portion is charged into a 1 liter reaction vessel under a nitrogen atmosphere and mixed to form a complete solution of the diamine. The temperature of the charge is adjusted to 25° C. The second portion is added over a 15-minute period, the temperature of the reaction mixture being maintained between 25° C. and 30° C. The reaction is continued for about 80 minutes and the composition is sampled for viscosity. At this stage the preliminary viscosity is about T on the Gardner-Holdt scale at 25° C. The third portion is added and the reaction is continued for 40 minutes. At the end of this stage the preliminary viscosity is about Z-1. The fourth portion is added and the reaction continued for about 40 minutes at 25° to 30° C. At the end of this stage the preliminary viscosity is about Z-2 and the composition is cooled. The initial addition of benzophenonetetracarboxylic acid dianhydride corresponds to about 0.97 mole per mole of the diamine. Each of the subsequent additions of dianhydride correspond to a relative proportion of 0.01 mole. Thus the total addition of the dianhydride is about 0.99 mole per mole of the diamine. The inherent viscosity of the resulting polyamic acid Composition II is about 0.82 based on the solution viscosity at 25° C.

*Experiment J*

To a portion of this polyamic acid Composition II is added formic acid (Eastman 98+%) in a proportion of 0.5% of formic acid based on the polymer content and blended therewith. A second portion of this unmodified Composition II is reserved as a comparative composition. These samples are stored in a 38° C. oven and examined weekly for deviation from the initial viscosity. The respective patterns of the viscosity change during storage substantially follow that observed with the unmodified polyamic acid Composition I and that composition modified with 0.5% of formic acid. Both the unmodified and modified Composition II samples exhibit an initial dip in viscosity. After this dip, the comparative Composition II rapidly increases in viscosity and proceeds to a gel state. The period at which the formic acid modified Composition II remains in a useful viscosity condition is usually at least twice that of the unmodified composition.

PREPARATION OF POLYAMIC ACID
COMPOSITION III

| First portion: | Grams |
|---|---|
| N,N-dimethylacetamide | 407.0 |
| N-methyl-2-pyrrolidone | 814.0 |
| Meta-phenylenediamine | 81.0 |
| Second portion: | |
| Pyromellitic dianhydride | 160.2 |
| Third portion: | |
| Pyromellitic dianhydride | 1.65 |
| Fourth portion: | |
| Pyromellitic dianhydride | 1.65 |
| Fifth portion: | |
| Pyromellitic dianhydride | 1.65 |
| | 1467.15 |

The first portion is charged into a 1500 ml. reaction flask under a nitrogen atmosphere and mixed to dissolve the diamine. The second portion is slowly added over a 30-minute period, the temperature of the reaction mixture being maintained in the 25° to 30° C. range by use of an ice bath while the mixture is rapidly stirred. The reaction is continued for 50 minutes and then the third portion is added. After a further reaction period of 25 minutes, the fourth portion is added and the reaction continued for 25 minutes. The fifth portion is added and the reaction is continued for an additional 25 minutes. The polymer of the resulting polyamic acid Composition III is characterized by an inherent viscosity of 0.88 (25° C.).

*Experiment K*

Formic acid is blended with a portion of this polyamic acid Composition III in the proportion of 0.5% based on the polymer content. A portion of the unmodified Composition III is reserved as a comparative composition. Surveillance of the viscosity characteristics of these compositions during storage at 38° C. reveals that each registers a significant dip in viscosity and that the gel state occurs in a significantly shorter period with the unmodified Composition III in comparison with that of this composition modified with 0.5% of formic acid. The period over which the formic acid modified composition remains in a useful viscosity state is at least double that of the unmodified composition.

*Experiment L*

Polyamic acid Compositions I, II, and III are respectively blended with commercially available 90% formic acid, in place of the 98+% Eastman grade heretofore used in the experiments, in the proportion of 0.5% formic acid (100%) based on the polymer content. Viscosity surveillance of these modified compositions during storage at about 38° C. reveals the same viscosity patterns and delayed solution gelation as is observed with the use of the 98+% formic acid.

The respective modified polyamic acid compositions and the unmodified comparative polyamic acid Compositions I, II, and III are each coated on glass panels and on sheet metal panels at a film thickness of about one mil and are cured by heating for 30 minutes at an oven temperature of about 150° C. All of the cured modified coatings appear comparable with the cured comparative unmodified compositions regardless of whether the respective modifying chemical compounds are adequately effective for controlling the viscosity characteristics and for retarding solution gelation of the polyamic acid solution.

EXAMPLE 1

To polyamic acid Composition I is added and blended therewith about 0.01 gram mole of formic acid per 100 grams of the polyamic acid content. The resulting solution is filtered through #1 filter paper. This modified solution is used as a wire enamel for coating #18 copper wire, using a commercial type wire coating machine having an adjustable coating speed and equipped with a 12-foot curing oven having a temperature ranging from about 55° C. up to a peak temperature in the 400° C. area. The wire is passed through a coating bath of the enamel at about 25° C., through the coating die, through the curing oven, and recycled through the circuit a plurality of times to provide the desired build of coating. Each coat usually provides about 0.5 mil build in diameter of the coated wire, six coats usually being required to provide the desired coating thickness of insulation, i.e., coated wire diameter increase of approximately 3 mils or about 1.5 mils coating thickness. Example 1A wire is annealed at a temperature of about 425° C., is coated at a coating speed of about 35 feet per minute, and cured at an oven temperature peaking at about 315° C. Curing of the applied polyamic acid coating at the elevated oven temperature converts the polymer to polyimide. Six passes provide the wire with polyimide insulation having a build of about 3.2 mils diameter increase. Example 1B wire is similarly coated using an annealing temperature of about 400° C., an oven peak curing temperature of about 375° C. and a coating speed of about 25 feet per minute. Six passes provides the wire with polyimide insulation having a build of about 2.7 mils diameter increase. Example 1C wire is similarly coated using an annealing temperature of about 380° C., an oven peak curing temperature of about 400° C. and a coating speed of about 18 feet per minute. Six passes provide the wire with polyimide insulation having a build of about 2.6 mils diameter increase. Unmodified polyamic acid Composition I is similarly coated and cured on wire as a comparative polyimide wire enamel. The appearance of the Example 1A, B and C coated wires and other physical properties thereof are rated equal to the comparative coated wire. Electrical properties evaluated by test procedures recognized by the electrical industry reveal equivalency between the polyimide insulation derived from the formic acid modified polyamic acid Composition I and the polyimide derived from the unmodified polyamic acid Composition I. The effective modifying proportion of formic acid in the polyamic acid solution produces no apparent changes in the quality or performance of the cured polyimide derived from the modified solution of polyamic acid.

The respective polyimides derived from polyamic acid Composition I respectively modified, per 100 grams of polymer, with about 0.01 gram mole of monochloroacetic acid, about 0.004 gram mole of benzeldehyde, about 0.004 gram mole of para-aminophenol, and about 0.001 gram mole of para-nitrobenzaldehyde are similarly evaluated and likewise exhibit no deviation in quality and performance from that of the cured polyimide resulting from heat-curing the polyamic acid deposited from the unmodified solution under the indicated wire coating conditions.

I claim:

1. A polyamic acid composition characterized by improved solution viscosity characteristics consisting essentially of a polyamic acid in solution in a volatile liquid organic solvent therefor and containing, as a solution viscosity stabilizing component an effective proportion of about 0.0003 to 0.025 gram mole per 100 grams of polyamic acid of a member of the group consisting of formic acid, monochloroacetic acid, benzaldehyde, para-aminophenol and para-nitrobenzaldehyde, said polyamic acid consisting essentially of a plurality of recurring units having the general structure:

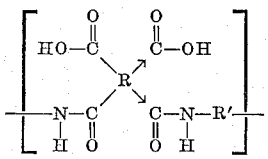

wherein the arrow → denotes isomerism, the radical

is a tetravalent organic radical containing at least two carbon atoms, no more than two carbonyl groups of each said structural unit being attached to any one carbon atom of the radical

—R'— is a divalent organic radical containing at least two carbon atoms, the amide groups of adjacent said structural polyamic units each being attached to separate carbon atoms of said divalent radical —R'—, said polyamic acid having an inherent viscosity of about 0.1 to 5 as measured in a 0.5% solution in N,N-dimethylacetamide at 25° C.

2. A stabilized polyamic acid composition of claim 1 wherein the effective proportions of said stabilizing components are: (I) 0.004 to 0.025 gram mole of formic acid, monochloroacetic acid and mixtures thereof, (II) 0.001 to 0.007 gram mole of benzaldehyde and para-aminophenol, and (III) .0003 to 0.003 gram mole of para-nitrobenzaldehyde, said proportions being recited on the basis of 10 grams of said polyamic acid polymer in solution.

3. A stabilized polyamic acid composition of claim 2 having a content of polyamic acid component in the range of 3% to 30% by weight.

4. A stabilized polyamic acid composition of claim 1 wherein said radical

is the R in a tetracarboxylic acid dianhydride having the general formula:

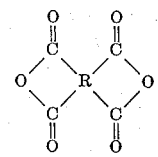

wherein the tetravalent organic radical

contains at least one ring of at least six carbon atoms, said ring being characterized by benzenoid unsaturation, each of the four carbonyl groups being attached directly to separate carbon atoms in a ring of the radical

and each pair of carbonyl groups being attached to adjacent carbon atoms in a ring of the radical

and said radical —R'— is the R' in a diamine having the general formula $H_2N$—R'—$NH_2$ wherein the divalent organic radical —R'— contains at least one ring of at least six carbon atoms, said ring being characterized by benzenoid unsaturation, each of the amino groups being attached directly to separate carbon atoms in a ring of the divalent radical —R'—.

5. A stabilized polyamic acid composition of claim 4 in which said dianhydride is pyromellitic dianhydride and said diamine is 4,4'-diaminodiphenyl ether.

6. A stabilized polyamic acid composition of claim 4 in which said dianhydride is 3,4,3',4'-benzophenone tetracarboxylic dianhydride and said diamine is 4,4'-diaminodiphenyl ether.

7. A stabilized polyamic acid composition of claim 4 in which said dianhydride is pyromellitic dianhydride and said diamine is meta-phenylenediamine.

8. A stabilized polyamic acid composition of claim 1 wherein said volatile organic solvent for the polyamic acid comprises a normally liquid N,N-dialkylcarboxylamide.

9. A stabilized polyamic acid composition of claim 1 comprising 3% to 30% of said polyamic acid in solution in a volatile organic solvent therefor comprising a normally liquid N.N-dialkylcarboxylamide and containing formic acid in the proportion of from 0.004 to 0.025 gram mole per 100 grams of said polymer, said polyamic acid being the reaction product of about 0.97 to 1 mole of pyromellitic dianhydride per mole of 4,4'-diaminodiphenyl ether.

10. A method of preparing a polyamic acid composition characterized by improved solution viscosity characteristics which comprises mixing in approximately equimolar proportions at least one tetracarboxylic acid dianhydride having the general formula:

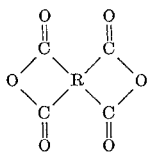

wherein the radical

is a tetravalent organic radical containing at least two carbon atoms, no more than two carbonyl groups thereof being attached to any one carbon atom of the radical

and at least one diamine having the general formula $H_2N-R'-NH_2$ wherein the radical —R'— is a divalent organic radical containing at least two carbon atoms, each of the amino groups being attached to separate carbon atoms of the radical —R'—, in the presence of a volatile organic liquid which is a solvent for at least one of said reactants and is a solvent for the resulting polyamic acid, the polymerization reaction being continued until said polymer is characterized by an inherent viscosity in the range of 0.1 to 5 based on a solution at 0.5% concentration of the polyamic acid component in N,N-dimethylacetamide at 25° C., and adding to the resulting polyamic acid solution and blending therewith, as a stabilizing component therefor in the following proportions per 100 grams of said polyamic acid, a chemical compound selected from the group consisting of: (I) 0.004 to 0.025 gram mole of formic acid, monochloroacetic acid and mixtures thereof, (I) 0.001 to 0.007 gram mole of benzaldehyde and para-aminophenol, and (III) 0.0003 to 0.003 gram mole of para-nitrobenzaldehyde, said solution having a concentration up to 40% by weight of said polyamic acid.

11. A method of claim 10 wherein the tetravalent radical

contains at least one ring of at least six carbon atoms, said ring being characterized by benzenoid unsaturation, each of the four carbonyl groups being attached directly to separate carbon atoms in a ring of the radical

and each pair of carbonyl groups being attached to adjacent carbon atoms in a ring of the radical

and said radical —R'— contains at least one ring of at least six carbon atoms, said ring being characterized by benzenoid unsaturation, each of the amino groups being attached directly to separate carbon atoms in a ring of the divalent radical —R'—, and said solvent comprises a normally liquid N,N-dialkylcarboxylamide.

12. A method of claim 10 wherein said stabilizing compound is formic acid.

References Cited by the Examiner

UNITED STATES PATENTS 2,374,145  4/1945  Taylor _____ 260—78
3,073,784  1/1963  Endrey _____ 260—78

WILLIAM H. SHORT, *Primary Examiner.*

JOSEPH LIBERMAN, LOUISE P. QUAST,
*Examiners.*